United States Patent [19]

Schweitzer, III

[11] Patent Number: 5,317,472
[45] Date of Patent: May 31, 1994

[54] APPARATUS FOR INSURING THE SECURITY OF OUTPUT SIGNALS FROM PROTECTIVE RELAYS USED IN ELECTRIC POWER SYSTEMS

[75] Inventor: Edmund O. Schweitzer, III, Pullman, Wash.

[73] Assignee: Schweitzer Engineering Laboratories, Inc., Pullman, Wash.

[21] Appl. No.: 853,035

[22] Filed: Mar. 17, 1992

[51] Int. Cl.⁵ .......................... H02H 3/00; H02H 3/05
[52] U.S. Cl. ..................................... 361/115; 361/62; 361/81
[58] Field of Search ..................................... 361/78–83, 361/62–68, 88, 89, 93, 94, 115

[56] References Cited

U.S. PATENT DOCUMENTS 4,314,301  2/1982  Kondow et al. .................... 361/65

*Primary Examiner*—A. D. Pellinen
*Assistant Examiner*—Ronald W. Lejá

[57] ABSTRACT

In a protective relay (10), which contains a microprocessor (30), for monitoring a power transmission line, an output enable decoder (72) and a one-shot timer (74) produce a very short (5 microsecond) signal in response to an address signal from the microprocessor. The output from the timer is applied as one input to AND gate (70). A conventional address decoder, responsive to an address signal identifying a particular output port from the microprocessor, provides another output to AND gate (70). AND gate (70) produces a latch control signal when the two signals are coincident in time. The latch control signal enables the particular output port to receive instructions from a data bus (60).

10 Claims, 2 Drawing Sheets

APPARATUS FOR INSURING THE SECURITY OF OUTPUT SIGNALS FROM PROTECTIVE RELAYS USED IN ELECTRIC POWER SYSTEMS

DESCRIPTION

1. Technical Field

This invention relates generally to the field of relay protection for electric power systems, and more particularly concerns apparatus for insuring that the signal outputs of a protective relay are correct.

2. Background Of The Invention

Digital protective relays are now typically used in the protection of electric power systems. Referring to FIG. 1, which shows a conventional system, a digital relay 10 monitors the voltage and current on a power transmission line 12 by means of a current transformer 14 and a voltage transformer 16. Relay 10 will in operation process these inputs against established reference values, and will produce an output control signal which in turn will result in a control event, such as the closing of output contacts 18, in the event that an out-of-tolerance condition occurs, due to a fault on the transmission line 12. In such a situation, the closing of output contacts 18 will result in a current through a trip coil 20 which will in turn trip a circuit breaker 22 in the transmission line 12 to interrupt the current on the transmission line and clear the fault.

In operation, protective relay 10, by virtue of its microprocessor capability, will close output contacts 18 by instructions provided through an address decoder logic assembly. Contact points 18, among all the other input and output contacts of the relay, will have a unique address assigned to it which is decoded by the address decoder logic assembly. The address of the output port having the desired output contact is provided by the microprocessor along with the instructions. Typically, the address information is accurate. However, it is possible that errors, such as due to noise, programming errors or the like, could result in incorrect address information provided to the decoder, which would in turn result in instructions provided to an incorrect output port, including, for instance, output contacts 18. In such a case, the, circuit breaker 22 would trip when there is no fault on the line, which is, of course, highly undesirable. The present invention insures that the instructions reaching particular output ports are intended to reach those ports.

DISCLOSURE OF THE INVENTION

Accordingly, the present invention is an apparatus to insure the correct assertion of output signals by a protective relay used in a power transmission system comprising: an output port decoder which is part of a protective relay which in turn includes a microprocessor and which is part of a protection system for a power transmission system, the port decoder, in response to address information from the microprocessor, producing an address signal associated with a particular output port of the relay; an enable decoder assembly in the protective relay responsive to an address enable signal from the microprocessor to produce an output enable signal for a selected period of time; and means which is responsive to the coincidence in time of the output enable signal and the address signal to produce a control signal which is applied to said particular output port to enable said particular output port to receive instructions from the microprocessor.

BEST MODE FOR CARRYING OUT THE INVENTION

Figure 1:
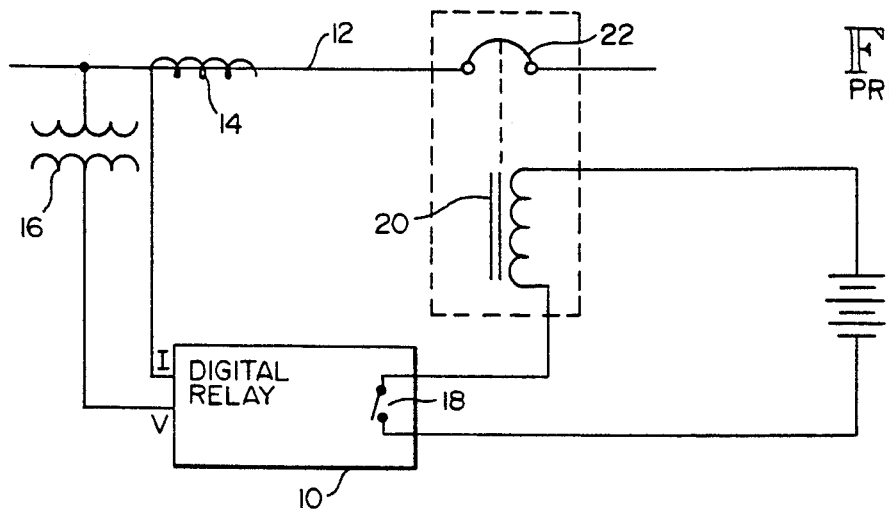
FIG. 1 is a simplified diagram of a conventional prior art power transmission line protection system which includes a digital relay.
Figure 2:
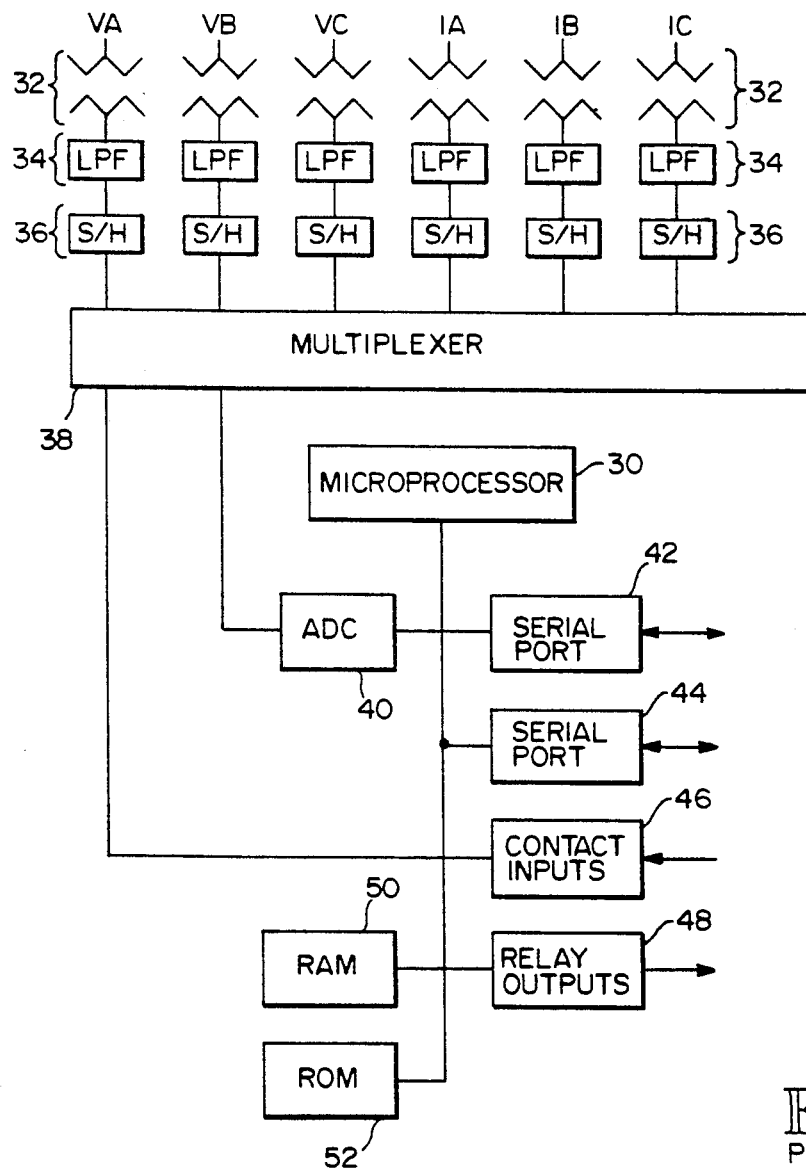
FIG. 2 is a simplified block diagram showing in more detail the digital relay shown in FIG. 1, which may also be used in the present invention.

FIG. 2 shows a portion of a digital protective relay for a power transmission line system, including a microprocessor 30. Current and voltage for all three phases A, B, and C of a three-phase power signal on a power transmission line are obtained through transformers shown generally at 32-32. The outputs of transformers 32 are then applied through low pass filters 34, shown generally at 34-34, and sample and hold gates, shown generally at 36-36, to a multiplexer 38. The microprocessor 30 reads this data after it has been processed through an analog-to-digital converter 40. Also in the portion of the relay shown are two serial ports 42 and 44, input contacts which are shown as a group at 46, output contacts which are shown as a group at 48, and RAM (Random Access Memory) and ROM (Read Only Memory) storage devices 50 and 52. The complete relay apparatus contains additional circuitry which is not particularly relevant to the present invention.

In operation, the microprocessor 30 will read inputs from the A/D converter 40, and will store the results of its processing, as well as other information, in RAM 50. When the results of this processing indicate that particular outputs should be asserted, i.e. contacts which control a circuit breaker in the event of a fault on the line, microprocessor 30 will receive and execute instructions from ROM 52 to write to the selected relay output ports 48. The output ports 48 may either appear to the microprocessor 30 as particular locations in the memory map of the microprocessor or be associated with selected locations in the microprocessor memory.

Figure 3:
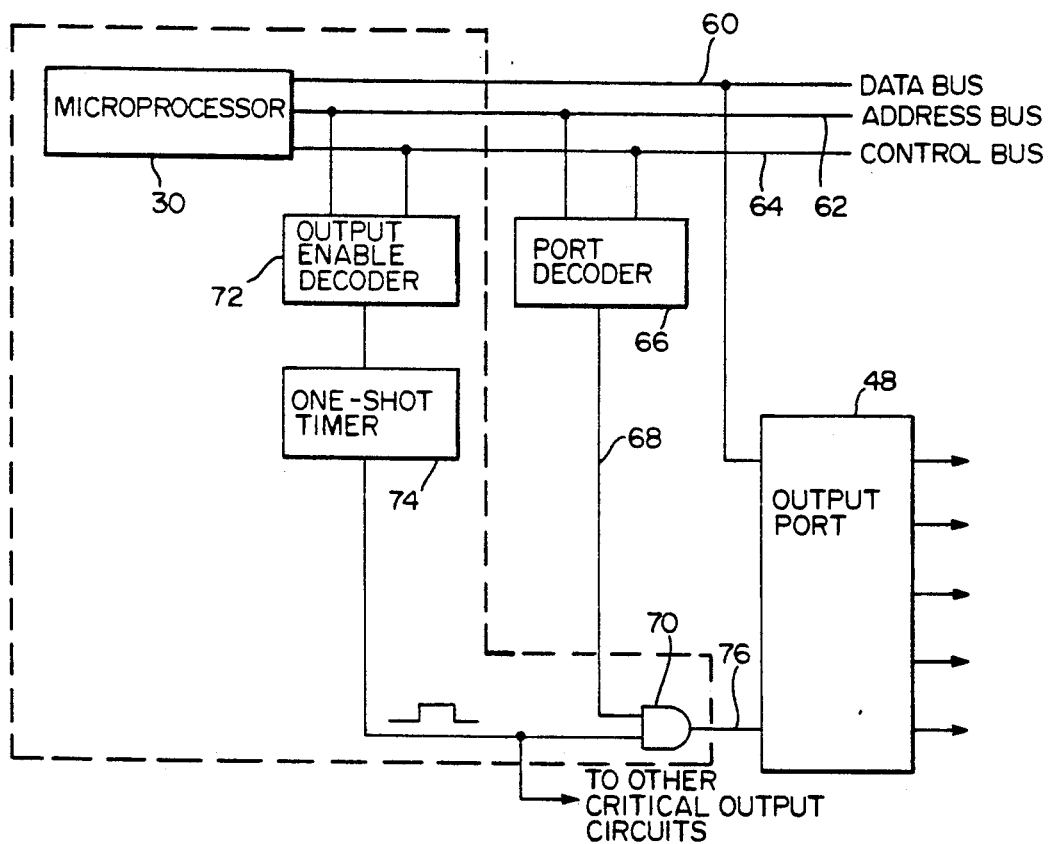
FIG. 3 is a block diagram showing the present invention.

Referring now to FIG. 3, the reading of information from input contacts and the writing of instructions to desired output contacts occurs between microprocessor 30, ROM and RAM memory, and the desired output contacts by means of a data bus 60, an address bus 62 and a control bus 64. In conventional operation, control bus 64 is used to control the data direction on the lines. Address decoding logic present in port decoder 66 will decode the output port address from the information provided by microprocessor 30 on address bus 62 and produce a signal on line 68 to an AND gate 70. The output port decoder 66 in the embodiment shown could be either external to the microprocessor 30 as shown or an internal part of the microprocessor. Conventionally the signal from port decoder 66 would go directly to output ports 48.

The present invention includes in addition to port decoder 66 an output enable decoder 72. Decoder 72 has an address which is separated from the address of decoder 66 in the internal memory of microprocessor 30. The output of enable decoder 72 is applied to a one-shot timer 74, which produces a pulse output of specific limited duration. This signal is applied to AND gate 70, along with the output from the conventional port decoder 66.

In operation, microprocessor 30, upon its recognition that instructions are to be written to a particular output port, will produce the unique address of the output enable decoder 72, which in turn detects its address and produces a signal to one-shot timer 74, which produces an enable signal which is applied to AND gate 70. Typically, the enable signal from timer 74 will be quite short, on the order of 5 microseconds. The enable signal is in essence an independent confirmation, of short duration, that an output is to be asserted. The port decoder 66 will at the same time receive the unique address of the desired output port, will decode that address and send a signal to AND gate 70 on line 68. If there is coincidence in time between the signals from port decoder 66 and enable decoder 72, and there will in fact be such coincidence when an output is to be asserted, AND gate 70 will produce an output on line 76 which controls the latch circuitry in the particular output port to be asserted (among the several comprising the group thereof shown at 48) so that the instructions on data bus 60 are transferred to the particular selected output.

The above system increases the security of the system and insures assertion of the correct output, because the particular output port can accept the instructions from the microprocessor 30 only during the very short time duration of the signal from timer 74.

It should be understood that the output from timer 74 could be used to specifically enable other circuits in the relay.

Although a preferred embodiment of the invention has been disclosed herein for illustration, it should be understood that various changes, modifications and substitutions may be incorporated in such embodiment without departing from the spirit of the invention which is defined by the claims which follow:

What is claimed is:

1. An apparatus for insuring the correct assertion of output signals by a protective relay used in a power transmission system, comprising:

output port decoder means in a protective relay which includes a microprocessor and which is used in a power transmission system, said output port decoder means, in response to address information from the microprocessor, producing an address signal identifying a particular output port of the relay;

an enable decoder assembly in the protective relay responsive to an address enable signal from the microprocessor to produce an output enable signal for a selected period of time; and means responsive to the coincidence in time of the output enable signal an the address signal to produce a control signal which is applied to said particular output port to enable said particular output port to receive instructions from the microprocessor.

2. An apparatus of claim 1, wherein the output enable signal occurs for only a short period of time.

3. An apparatus of claim 2, wherein the short period of time is approximately 5 microseconds.

4. An apparatus of claim 1, wherein the particular output port controls a circuit breaker on the power transmission system.

5. An apparatus of claim 1, wherein the enable decoder assembly includes (a) a decoder which produces a decoder signal in response to receiving an address enable signal containing its own unique address and (b) a timer element responsive to the decoder signal to produce said output enable signal.

6. An apparatus of claim 1, wherein the particular output port appears to the microprocessor as a location in the memory map of the microprocessor.

7. An apparatus of claim 1, wherein the particular output port is associated with a selected location in the memory of the microprocessor.

8. An apparatus of claim 1, wherein said output port decoder is external to the microprocessor.

9. An apparatus of claim 1, wherein said output port decoder is internal to the microprocessor.

10. An apparatus of claim 1, wherein the output from the enable decoder assembly is usable in association with a plurality of different output ports.

* * * * *